(12) United States Patent
Fourie et al.

(10) Patent No.: US 11,473,949 B2
(45) Date of Patent: Oct. 18, 2022

(54) FLOWMETER

(71) Applicant: Eugene Fourie, Pretoria (ZA)

(72) Inventors: Eugene Fourie, Pretoria (ZA); Werner Morgenrood, Auckland (NZ); Leon Le Roux De Beer, Pretoria (ZA)

(73) Assignee: Eugene Fourie, Pretoria (ZA)

(*) Notice: Subject to any disclaimer, the term of this patent is extended or adjusted under 35 U.S.C. 154(b) by 40 days.

(21) Appl. No.: 16/769,136

(22) PCT Filed: Dec. 3, 2018

(86) PCT No.: PCT/ZA2018/050062
§ 371 (c)(1),
(2) Date: Jun. 2, 2020

(87) PCT Pub. No.: WO2019/109113
PCT Pub. Date: Jun. 6, 2019

(65) Prior Publication Data
US 2021/0231479 A1 Jul. 29, 2021

(30) Foreign Application Priority Data
Dec. 3, 2017 (ZA) .................................. 201706449

(51) Int. Cl.
*G01F 1/66* (2022.01)
*G01N 29/02* (2006.01)
*G01N 29/22* (2006.01)

(52) U.S. Cl.
CPC ............. *G01F 1/662* (2013.01); *G01N 29/02* (2013.01); *G01N 29/222* (2013.01)

(58) Field of Classification Search
CPC ........... G01F 1/66; G01F 1/662; G01N 29/02; G01N 29/22; G01N 29/222
See application file for complete search history.

(56) References Cited

U.S. PATENT DOCUMENTS

| 3,771,117 A * | 11/1973 | Shaffer | G01F 1/662 367/165 |
|---|---|---|---|
| 5,553,505 A | 9/1996 | Bignell et al. | |
| 2006/0052963 A1 * | 3/2006 | Shkarlet | G01F 1/668 702/108 |
| 2011/0271770 A1 | 11/2011 | Wiest et al. | |
| 2015/0177036 A1 | 6/2015 | Speidel | |
| 2017/0122916 A1 * | 5/2017 | Leaders | G01N 29/26 |
| 2017/0314977 A1 | 11/2017 | Wiest et al. | |

FOREIGN PATENT DOCUMENTS

FR 3047068 A1 7/2017

OTHER PUBLICATIONS

Bertrand Reeb (Authorized Officer), International Search Report dated Apr. 4, 2019, PCT Application No. PCT/ZA2018/050062, 3 pages.

* cited by examiner

*Primary Examiner* — Benjamin R Schmitt
(74) *Attorney, Agent, or Firm* — MH2 Technology Law Group LLP (57) ABSTRACT

According to the invention there is provided a flowmeter (10) includes a body (12) defining a passageway (14) for allowing fluid to flow therethrough and a sensing arrangement (16) which extends substantially inwardly from opposing end regions (18) of the passageway (14) for sensing a flow of fluid through the passageway (14) along an axis (20) which is substantially parallel thereto.

18 Claims, 7 Drawing Sheets

FLOWMETER

CROSS REFERENCE TO RELATED APPLICATIONS

This application is the National Phase of PCT International Application No. PCT/ZA2018/050062, filed on Dec. 3, 2018, which claims priority under 35 U.S.C. 119(a) to Patent Application No. 2017/06449, filed in South Africa on Dec. 3, 2017, all of which are hereby incorporated by reference in their entirety into the present application.

TECHNICAL FIELD

This invention relates to a flowmeter. In particular, this invention relates to a flowmeter for measuring fluid flow through a pipe and/or passageway.

SUMMARY OF THE INVENTION

According to the invention, there is provided a flowmeter including:— a body defining a passageway for allowing fluid to flow therethrough; and a sensing arrangement which extends substantially inwardly from opposing end regions of the passageway for sensing a flow of fluid through the passageway along an axis which is substantially parallel thereto.

The body may define inlet and outlet portions for allowing fluid to flow into and out of the passageway and an intermediate portion between the inlet and outlet portions having a reduced cross-sectional area compared to the inlet and outlet portions. A central axis of the intermediate portion may be offset relative central axes of the inlet and outlet portions. More particularly, the central axis of the intermediate portion may be offset an angle in the range of 2 degrees and 6 degrees, preferably being 3.8 degrees, relative the central axes of the inlet and outlet portions. The passageway may taper generally from the outlet and inlet portions towards the intermediate portion to encourage laminar flow therethrough.

Guide formations may be provided which extend into the passageway for guiding the flow of fluid therethrough and encouraging laminar flow of the fluid. The guide formations may be sized, shaped and/or configured to guide the flow of fluid along a generally wave-like, undulating and/or arcuate path through the intermediate portion during an operative fluid flow condition wherein fluid is flowing through the passageway. The guide formations may be located diametrically opposite each other. Further, the guide formations may be shaped to form reduced flow zones in the vicinity thereof during the operative fluid flow condition, the reduced flow zones preferably being formed towards the end regions of the intermediate zone between the guide formations. It is to be appreciated that the reduced flow zone may improve accuracy of the sensing arrangement by reducing turbulent flow, noise, cavitation and the formation of eddy currents around the guide formations in use.

The guide formations may define sensor housings for housing sensors of the sensing arrangement. The sensor housings may comprise a mounting member for mounting a sensor of the sensing arrangement thereon and a closure member for closing an inside region or cavity defined by the guide formation. The mounting members of each guide formation may be orientated relative the passageway such that sensors mounted thereon face each other along the central axis of the intermediate portion of the passageway. The closure member may be configured to close and/or seal the inside region or cavity defined by the housing and inhibit the ingress of fluid into the inside region during the operative fluid flow condition.

The body may comprise a pair of hollow members which define passages which taper from one end region towards an opposing end region thereof. The pair of hollow members may be connected via opposing end regions thereof during an operative aligned condition. The pair of hollow members may be substantially identical in shape and/or size. A sealing member, preferably in the form of an O-ring, may be provided for sealing a fit between the hollow members during an operative aligned condition. An aperture may be defined in a wall of each hollow member which extends into the inside region of the sensor housing for allowing wiring to be connected to the sensors in order to provide power thereto.

Sensors of the sensing arrangement may be in the form of a transmitter and a receiver which may be housed within the sensor housings of the guide formations, preferably being mounted on the mounting members thereof. The transmitter and receiver may be in the form of a pair of transceivers. The transceivers may be arranged in electrical communication with a processor which may be configured to process signals passing between the transceivers during the operative fluid flow condition. The processor may be configured to calculate a mass and/or volume flow rate of fluid flowing through the passageway, typically being based on a time of flight measurement of the signals passing between the transceivers. The transceivers may be configured to send signals between each other every 1 to 4 seconds, preferably being every 2 seconds, further preferably the transceivers may be configured to send signals between each other at a frequency in the range of 0.25 Hz to 100 Hz. The transceivers may be in the form of piezoelectric transceivers. The piezoelectric transceivers may be configured to vibrate when subject to a potential difference and/or voltage. In particular, the piezoelectric transceivers may be configured to vibrate at any suitable frequency, preferably vibrating at a frequency so as to produce ultrasonic sound waves in the range of 20 kHz and 10 MHz, preferably being 1 MHz.

Connecting members, preferably having threaded outer profiles, may extend from the body, preferably extending away from the body in the region of the inlet and outlet portions, for allowing the body to be connected in-line with a water supply.

A housing may be provided for housing the body, processor and a power source in use. The housing may include a first portion for housing the body and a second portion for housing the power source and the processor. The housing may have a generally rectangular form, preferably resembling a generally rectangular prism. The housing may include a pair of openings defined towards opposing longitudinal end regions thereof, the openings preferably leading to the first portion of the housing, for receiving corresponding hollow members complementally therein.

A locating formation may be provided for locating and guiding the hollow members into the operative aligned condition while being received by the first portion of the housing. The locating formation may be in the form of a slot and key arrangement, slots preferably being defined on inner walls of the housing and key-like protrusions being defined on an outer surface of the hollow members.

Retaining members may be provided for retaining the hollow members within the housing, particularly in the operative aligned condition. The retaining members may be sized, shaped and/or configured to be interposed between an outer surface of the hollow member and a wall of an opening of the housing. In particular, the retaining members may have a generally ring shape and may be dimensioned so as to form a friction fit between the hollow member and the wall of the opening. It is to be appreciated that the retaining member may be friction welded into position between the hollow member and the wall of the opening.

The body and housing may be manufactured form any suitable synthetic plastics material, preferably being manufactured from a thermoplastic of the group including acrylic, polypropylene, polystyrene, polyethylene, polyphenylene, polyaryletherketone and polyvinylchloride, preferably being polyphenylene sulphide having product code Ryton R-7-120BL which may be manufactured by Solvay™.

BRIEF DESCRIPTION OF THE DRAWINGS

A flowmeter in accordance with the invention will now be described by way of the following, non-limiting examples with reference to the accompanying drawings.

In the drawings:—

DETAILED DESCRIPTION OF THE INVENTION

Figure 1:
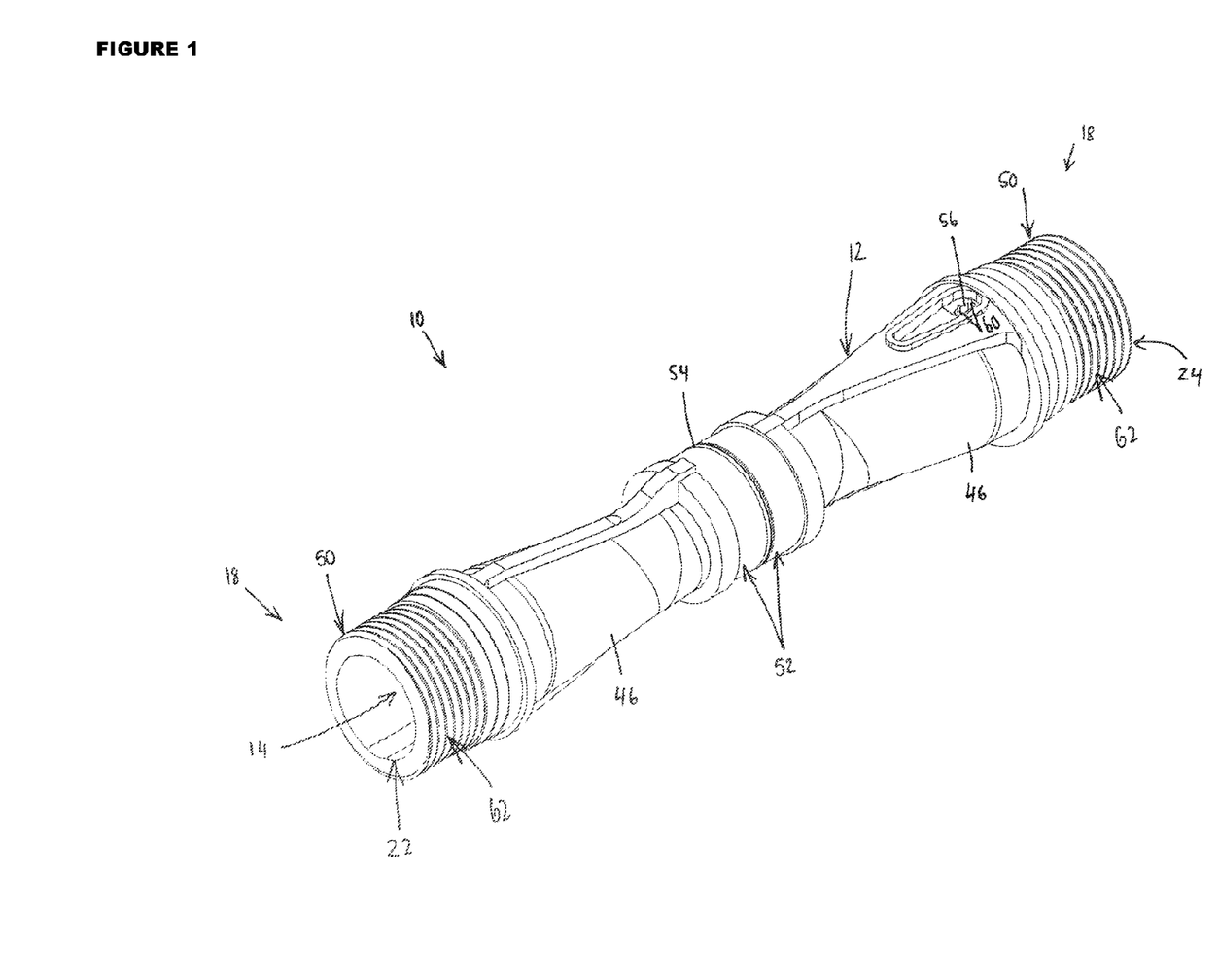
FIG. 1 is a three-dimensional schematic showing a flowmeter in accordance with the present invention.
Figure 2:
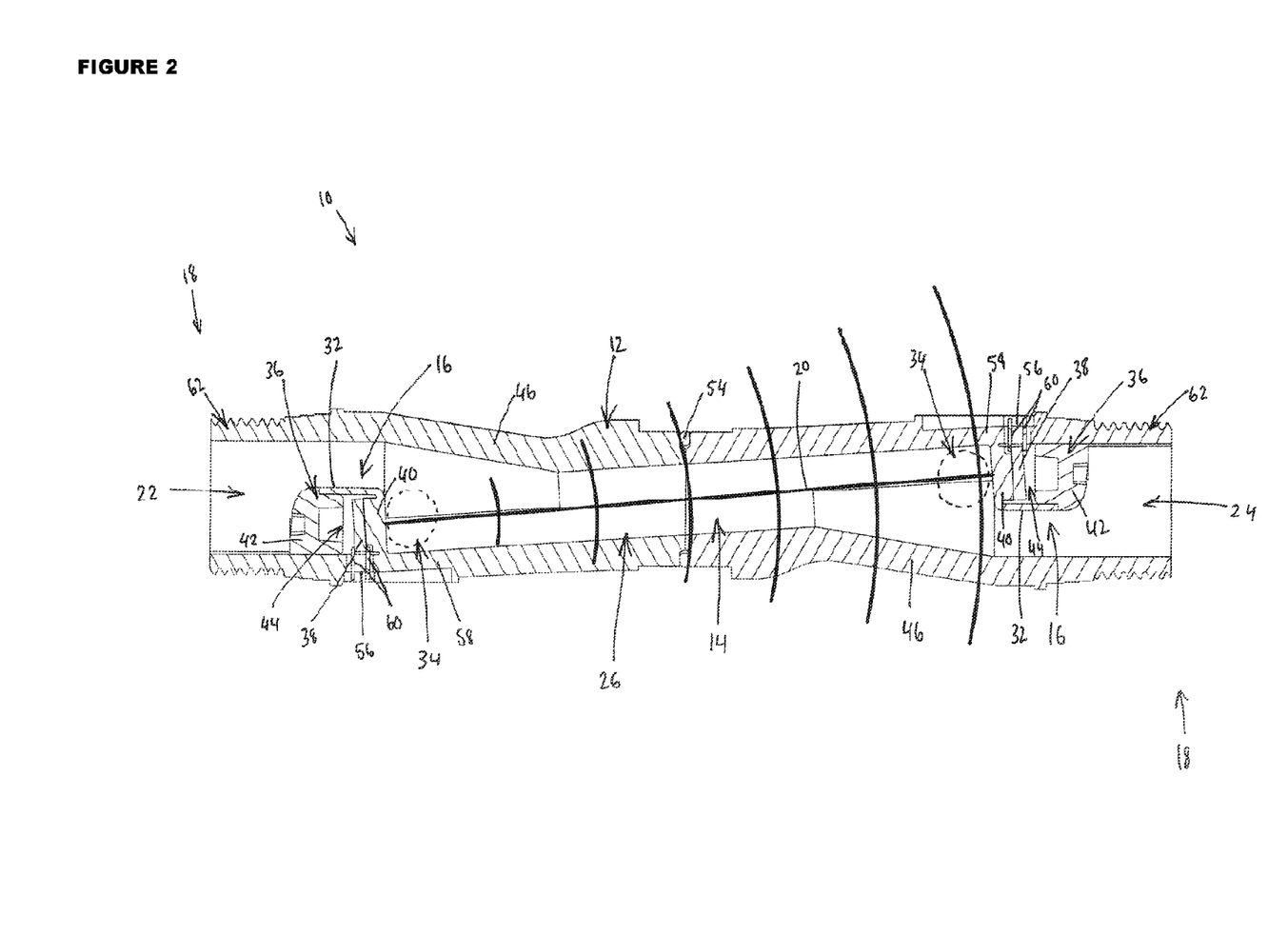
FIG. 2 is a cross-sectional view of the flowmeter shown in FIG. 1.
Figure 3:
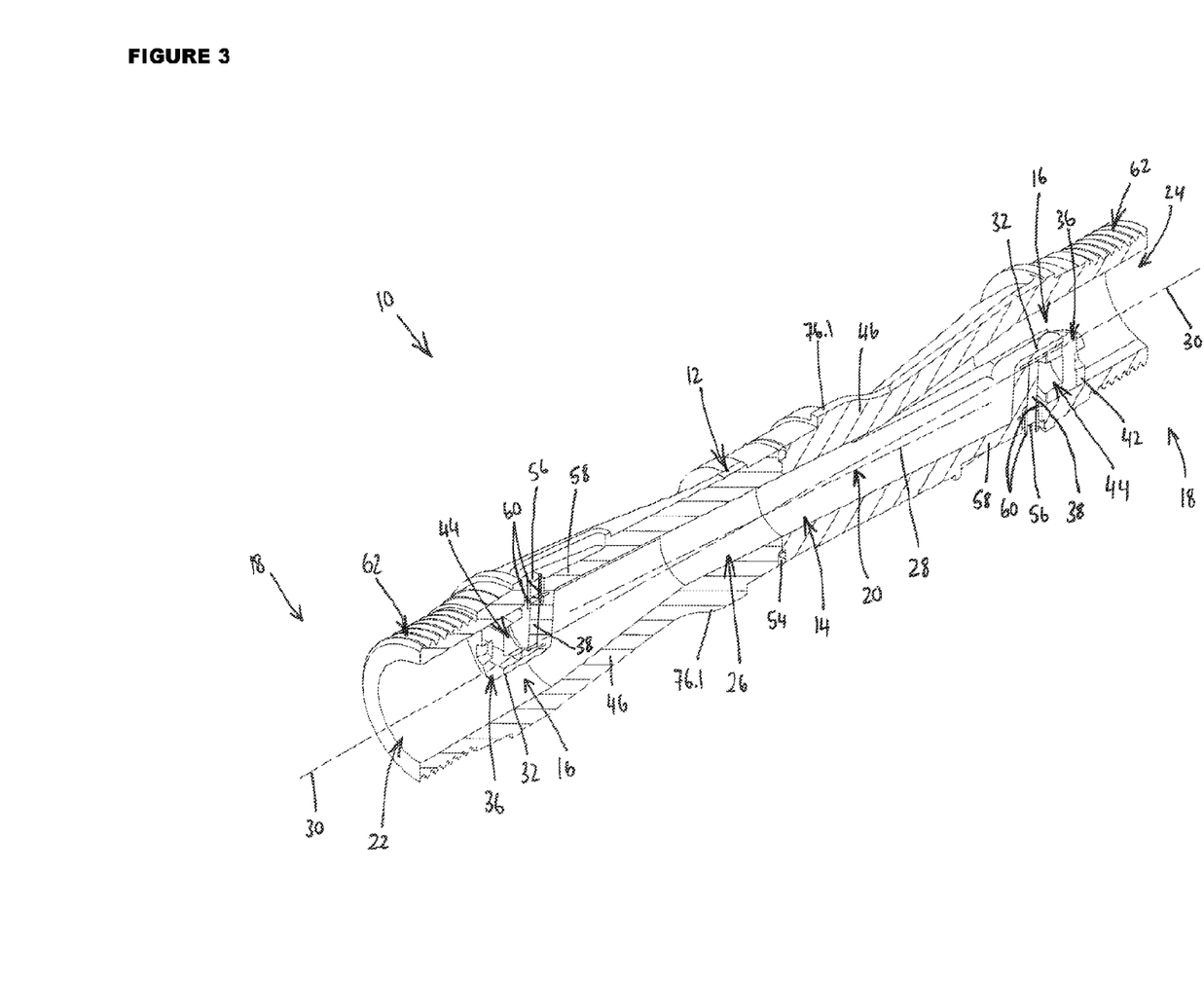
FIG. 3 is a three-dimensional cross-sectional view of the flowmeter shown in FIGS. 1 and 2.
Figure 4:
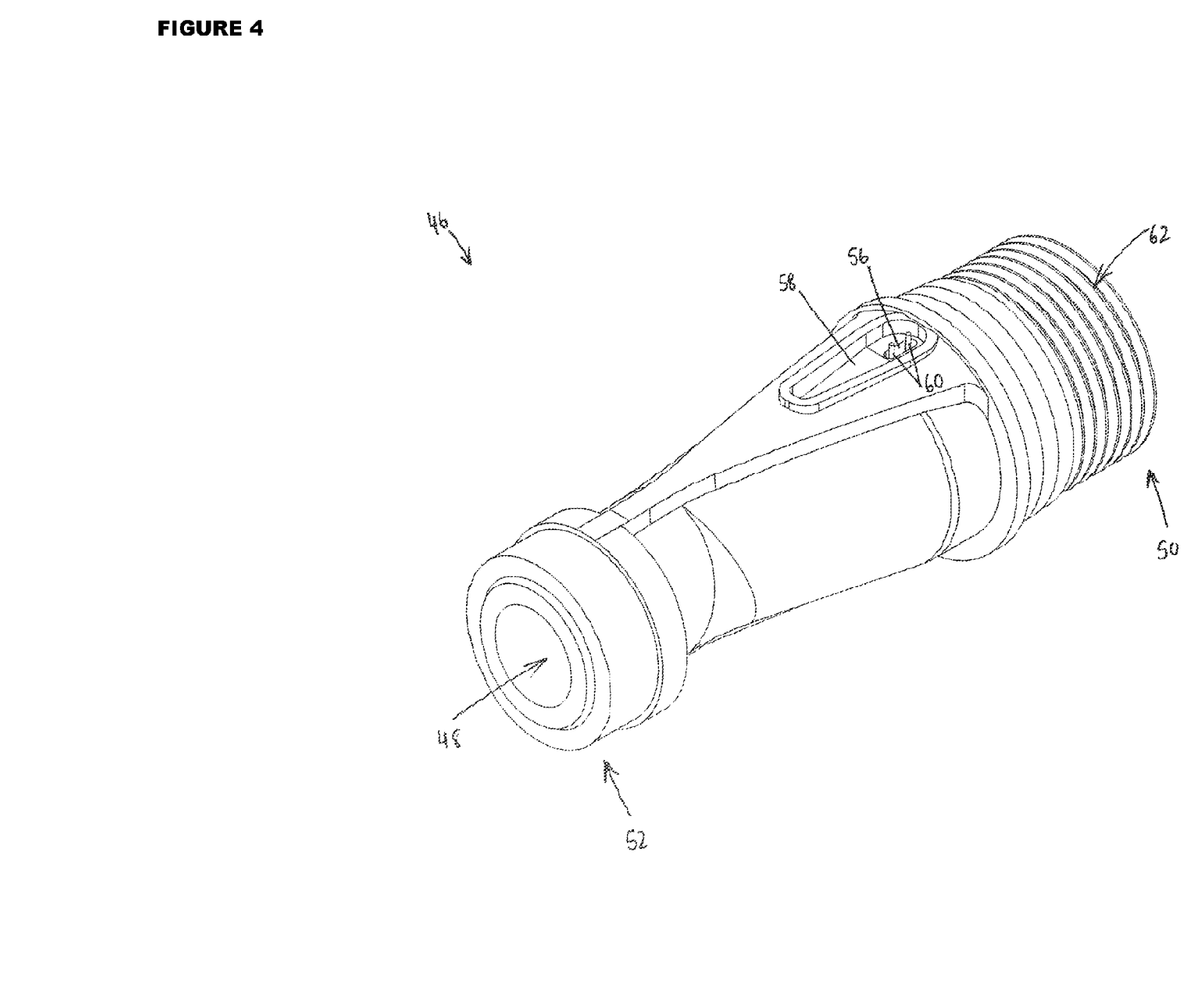
FIG. 4 is a three-dimensional schematic of a part of the flowmeter shown in FIGS. 1 to 3.
Figure 5A:
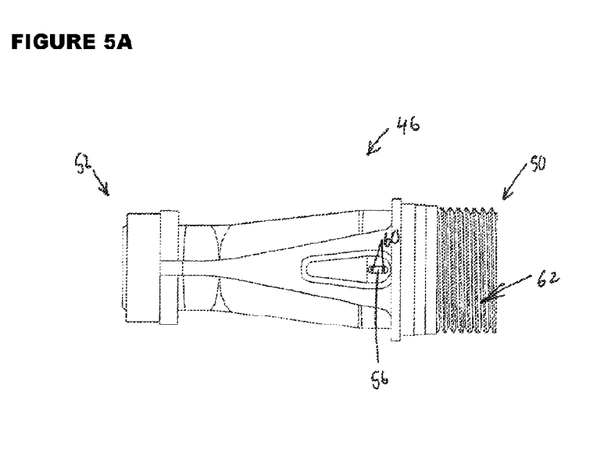
FIGS. 5a to 5d are top, side and cross-sectional views of the part of the flowmeter shown in FIG. 4.
Figure 5B:
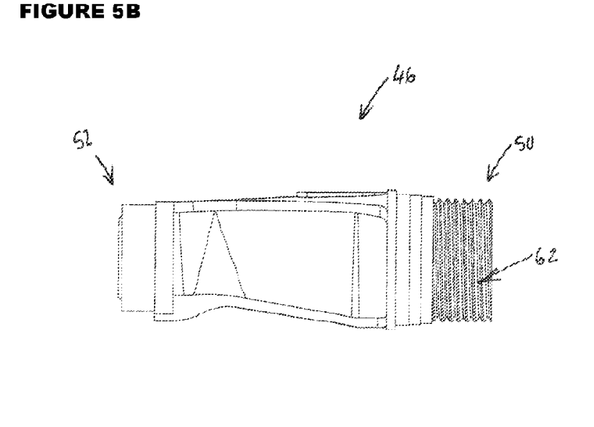
Figure 5C:
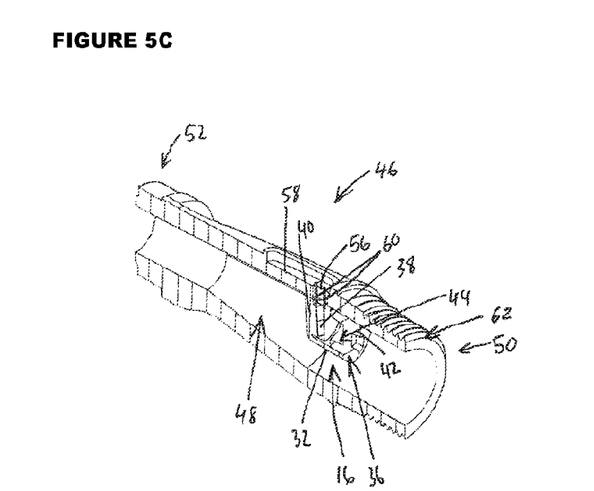
Figure 5D:
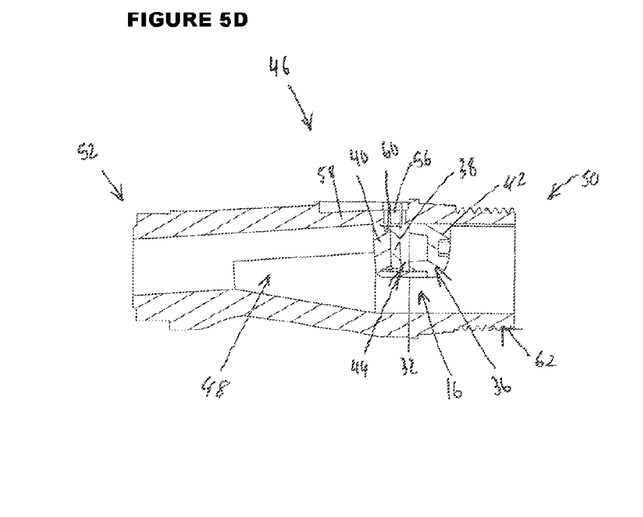
Figure 6:
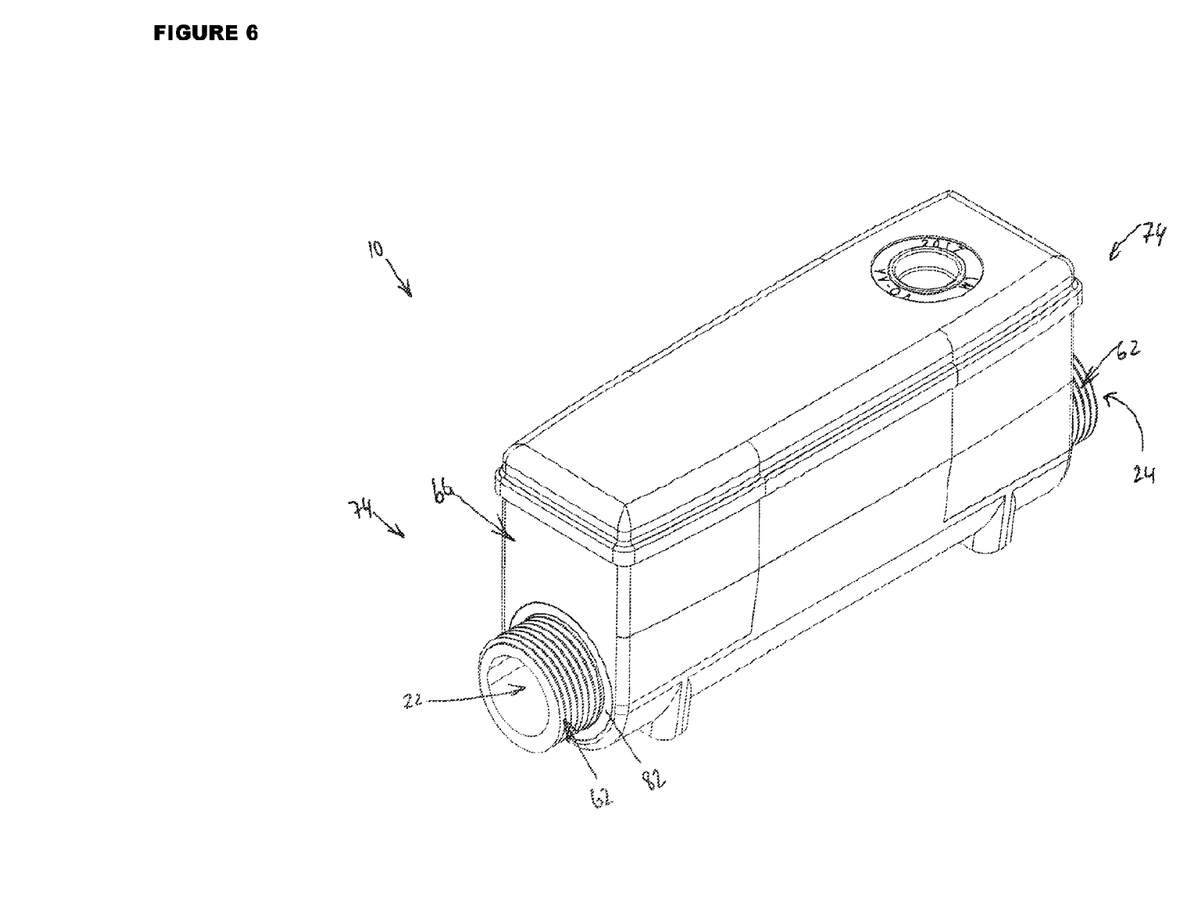
FIG. 6 is a three-dimensional schematic of a flowmeter in a housing in accordance with the invention.
Figure 7:
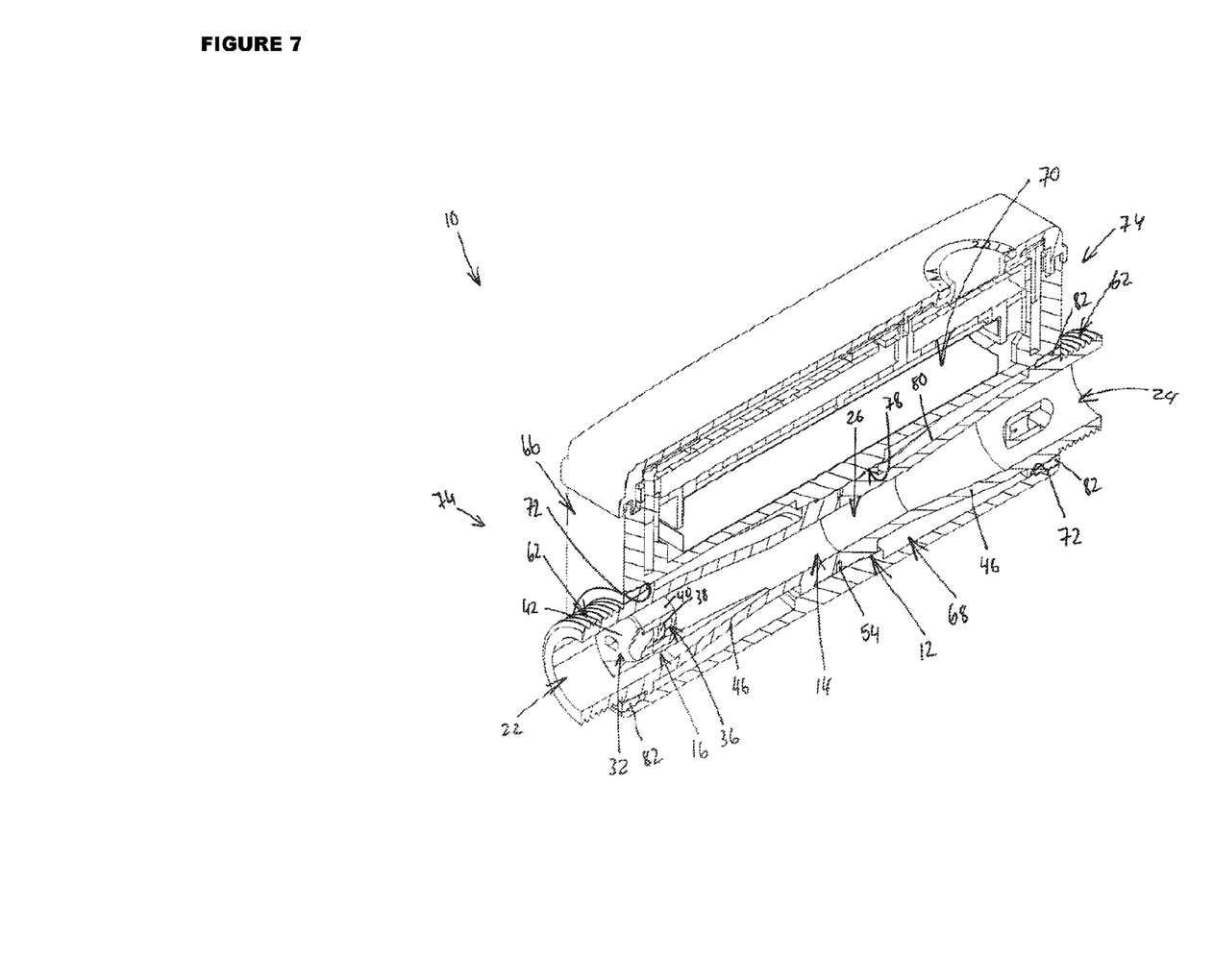
FIG. 7 is a three-dimensional cross-sectional view of the flowmeter and housing shown in FIG. 6.

Referring now to the drawings, reference numeral 10 refers generally to a flowmeter in accordance with the present invention. The flowmeter 10 includes a body 12 defining a passageway 14 for allowing fluid to flow therethrough and a sensing arrangement 16 which extends substantially inwardly from opposing end regions 18 of the passageway 14 for sensing a flow of fluid through the passageway 14 along an axis 20 which is substantially parallel thereto.

The body 12 defines inlet and outlet portions 22 and 24 for allowing fluid to flow into and out of the passageway 14 and an intermediate portion 26 between the inlet and outlet portions 22 and 24 having a reduced cross-sectional area compared to the inlet and outlet portions 22 and 24. A central axis 28 of the intermediate portion 26 is offset relative central axes 30 of the inlet and outlet portions 22 and 24. More particularly, the central axis 28 of the intermediate portion 26 is offset an angle in the range of 2 degrees and 6 degrees, typically being 3.8 degrees, relative the central axes 30 of the inlet and outlet portions 22 and 24. The passageway 14 tapers generally from the outlet and inlet portions 22 and 24 towards the intermediate portion 26 to encourage laminar flow therethrough.

Guide formations 32 are provided which extend into the passageway 14 for guiding the flow of fluid therethrough and encouraging laminar flow of the fluid. The guide formations 32 are sized, shaped and configured to guide the flow of fluid along a generally wave-like path through the intermediate portion 26 during an operative fluid flow condition wherein fluid is flowing through the passageway 14. The guide formations 32 are located diametrically opposite each other. Further, the guide formations 32 are shaped to form reduced flow zones 34 in the vicinity thereof during the operative fluid flow condition, the reduced flow zones 34 typically being formed towards the end regions 18 of the intermediate zone 26 between the guide formations 32. It is to be appreciated that the reduced flow zone 34 improves accuracy of the sensing arrangement 16 by reducing turbulent flow, noise, cavitation and the formation of eddy currents around the guide formations 32 in use.

The guide formations 32 define sensor housings 36 for housing sensors in the form of transceivers 38 of the sensing arrangement 16. The sensor housings 36 may comprise a mounting member 40 for mounting a transceiver 38 thereon and a closure member 42 for closing an inside region 44 defined by the guide formation 32. The mounting members 40 of each guide formation 32 are orientated relative the passageway 14 such that transceivers 38 mounted thereon face each other along the intermediate portion 26 of the passageway 14. The closure member 42 is configured to close and seal the inside region 44 defined by the housing 36 and inhibit the ingress of fluid into the inside region 44 during the operative fluid flow condition.

The body 12 comprises a pair of hollow members 46 which define passages 48 which taper from one end region 50 towards an opposing end region 52 thereof. The pair of hollow members 46 are connected via opposing end regions 52 thereof during an operative aligned condition. The pair of hollow members 46 are substantially identical in shape and size. A sealing member in the form of an O-ring 54 is provided for sealing a fit between the hollow members 46 during an operative aligned condition. An aperture 56 is defined in a wall 58 of each hollow member 46 which extends into the inside region 44 of the sensor housing 36 for allowing wiring 60 to be connected to the transceivers 38 in order to provide power thereto.

The transceivers 38 are arranged in electrical communication with a processor (not shown) which is configured to process signals passing between the transceivers 38 during the operative fluid flow condition, the processor (not shown) is configured to calculate a mass or volume flow rate of fluid flowing through the passageway 14, typically being based on a time of flight measurement of the signals passing between the transceivers 38. The transceivers 38 are configured to send signals between each other every 1 to 4 seconds, typically being every 2 seconds. The transceivers 38 can be configured to send signals between each other at a frequency in the range of 0.25 Hz to 100 Hz. The transceivers 38 are in the form of piezoelectric transceivers. The piezoelectric transceivers 38 are configured to vibrate when subject to a potential difference. In particular, the piezoelectric transceivers 38 are configured to vibrate at any suitable frequency, preferably vibrating at a frequency so as to produce ultrasonic sound waves in the range of 20 kHz and 10 MHz, typically being 1 MHz.

Connecting members 62 having threaded outer profiles extend from the body 12, typically extending away from the body 12 in the region of the inlet and outlet portions 22 and 24, for allowing the body 12 to be connected in-line with a water supply.

A housing 66 is provided for housing the body 12, processor (not shown) and a power source (not shown) in use. The housing 66 includes a first portion 68 for housing the body 12 and a second portion 70 for housing the power source (not shown) for the transceivers 38 and the processor (not shown). The housing 66 has a generally rectangular form, typically resembling a generally rectangular prism. The housing 66 includes a pair of openings 72 defined towards opposing end regions 74 thereof, the openings 72 typically leading to the first portion 68 of the housing 66 for receiving corresponding hollow members 46 complementally therein.

A locating formation in the form of a slot and key arrangement 76 is provided for locating and guiding the hollow members 46 into the operative aligned condition while being received by the first portion 68 of the housing 66. Slots 76.1 are typically defined on inner walls 78 of the housing 66 and key-like protrusions 76.2 are defined on an outer surface 80 of the hollow members 46.

Retaining members 82 are provided for retaining the hollow members 46 within the housing 66, particularly in the operative aligned condition. The retaining members 82 are sized, shaped and configured to be interposed between the outer surface 80 of the hollow member 46 and a wall of an opening 72 of the housing 66. In particular, the retaining members 82 have a generally ring shape and are dimensioned to form a friction fit between the hollow member 46 and the wall 84 of the opening 72. It is to be appreciated that the retaining member 82 is friction welded into position between the hollow member 46 and the wall 84 of the opening 72.

The body 12, sensor housings 36 and housing 66 is manufactured form suitable synthetic plastics material, typically being manufactured from a thermoplastic of the group including acrylic, polypropylene, polystyrene, polyethylene, polyphenylene, polyaryletherketone and polyvinylchloride, typically being polyphenylene sulphide having product code Ryton R-7-120BL and manufactured by Solvay™.

It is, of course, to be appreciated that the flowmeter in accordance with the invention is not limited to the precise constructional and functional details as hereinbefore described with reference to the accompanying drawings and which may be varied as desired.

The invention claimed is:

1. A flowmeter comprising:
a body defining a passageway for allowing fluid to flow therethrough, wherein the body defines an inlet portion and an outlet portion for allowing fluid to flow into and out of the passageway, wherein the body further defines an intermediate portion between the inlet and outlet portions having a reduced cross-sectional area compared to the inlet and outlet portions, wherein a central axis of the intermediate portion is offset by an angle in the range of 2 degrees to 6 degrees relative to central axes of the inlet and outlet portions; and
a sensing arrangement that extends substantially inwardly from opposing end regions of the passageway for sensing a flow of fluid through the passageway along an axis that is substantially parallel thereto.

2. The flowmeter of claim 1, wherein the passageway tapers generally from the outlet and inlet portions towards the intermediate portion to encourage laminar flow therethrough.

3. The flowmeter of claim 1, further comprising guide formations extending into the passageway for guiding the flow of fluid therethrough and encouraging laminar flow of the fluid.

4. The flowmeter of claim 3, wherein the guide formations are sized, shaped, and configured to guide the flow of fluid along a generally wave-like path through the intermediate portion during an operative fluid flow condition.

5. The flowmeter of claim 4, wherein the guide formations are located diametrically opposite each other and are shaped to form reduced flow zones in the vicinity thereof during the operative fluid flow condition, and wherein the reduced flow zones are formed towards end regions of the intermediate zone between the guide formations.

6. The flowmeter of claim 3, wherein the guide formations define sensor housings for housing sensors of the sensing arrangement.

7. The flowmeter of claim 6, wherein the sensor housings comprise a mounting member for mounting a sensor of the sensing arrangement thereon and a closure member for closing an inside region defined by the guide formation, wherein mounting members of each guide formation are orientated relative the passageway such that sensors mounted thereon face each other along the intermediate portion of the passageway, and wherein the closure member is configured to close and seal the inside region defined by the sensor housing and inhibit the ingress of fluid into the inside region during the operative fluid flow condition.

8. The flowmeter of claim 1, wherein the body comprises a pair of hollow members which define passages that taper from one end region towards an opposing end region thereof.

9. The flowmeter of claim 8, wherein the pair of hollow members are connected via opposing end regions thereof during an operative aligned condition.

10. The flowmeter of claim 9, further comprising a sealing member for sealing a fit between the hollow members during the operative aligned condition.

11. The flowmeter claim 8, wherein the pair of hollow members are substantially identical in shape and size.

12. The flowmeter of claim 8, wherein an aperture is defined in a wall of each hollow member, the aperture extending into an inside region thereof, for allowing wiring to be connected to sensors of the sensing arrangement in order to provide power thereto.

13. The flowmeter of claim 1, wherein sensors of the sensing arrangement are in the form of a pair of transceivers which are housed within the sensor housings.

14. The flowmeter of claim 13, wherein the transceivers are arranged in electrical communication with a processor configured to process signals passing between the transceivers during an operative fluid flow condition, the processor being configured to calculate any of the group including a volume flow rate and a mass flow rate of fluid flowing through the passageway.

15. The flowmeter of claim 13, wherein the transceivers are in the form of piezoelectric transceivers.

16. The flowmeter of claim 1, wherein connecting members having threaded outer profiles extend from the body for allowing the body to be connected in-line with a water supply.

17. The flowmeter of claim 1, further comprising a housing for housing the body, processor and a power source in use.

18. The flowmeter of claim 17, wherein the body and housing are manufactured from any one of the group of thermoplastics including acrylic, polypropylene, polystyrene, polyethylene, polyphenylene, polyaryletherketone and polyvinylchloride.

* * * * *